Feb. 17, 1970 H. SIMON 3,495,482
KEY MACHINE
Filed Oct. 30, 1967 3 Sheets-Sheet 1

Inventor
HARRY SIMON

Anderson, Luedeka, Fitch, Even, & Tabin
Attorneys

Feb. 17, 1970        H. SIMON        3,495,482
KEY MACHINE
Filed Oct. 30, 1967        3 Sheets-Sheet 2
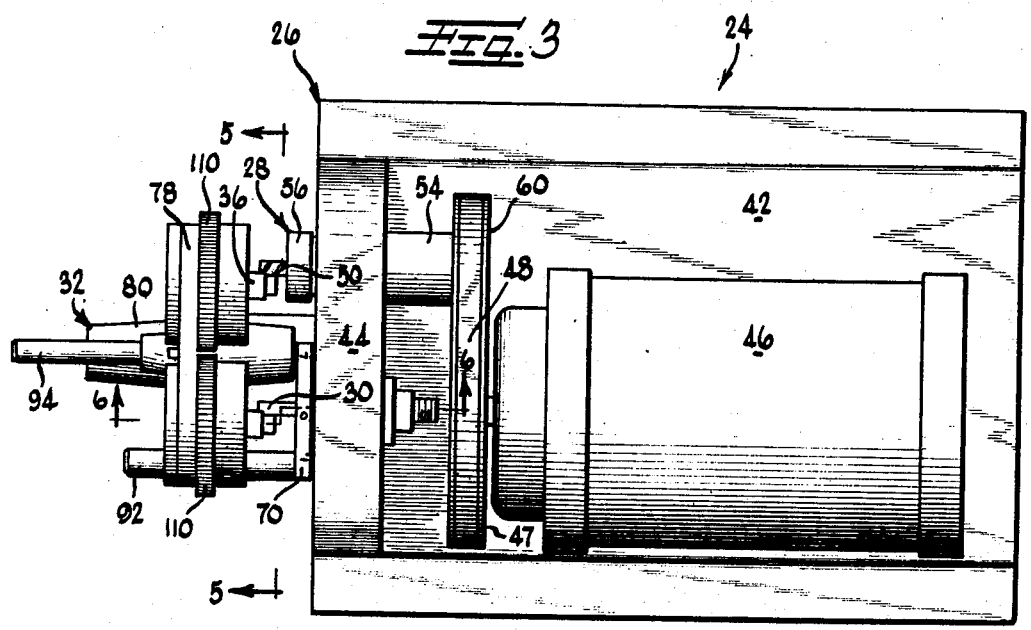
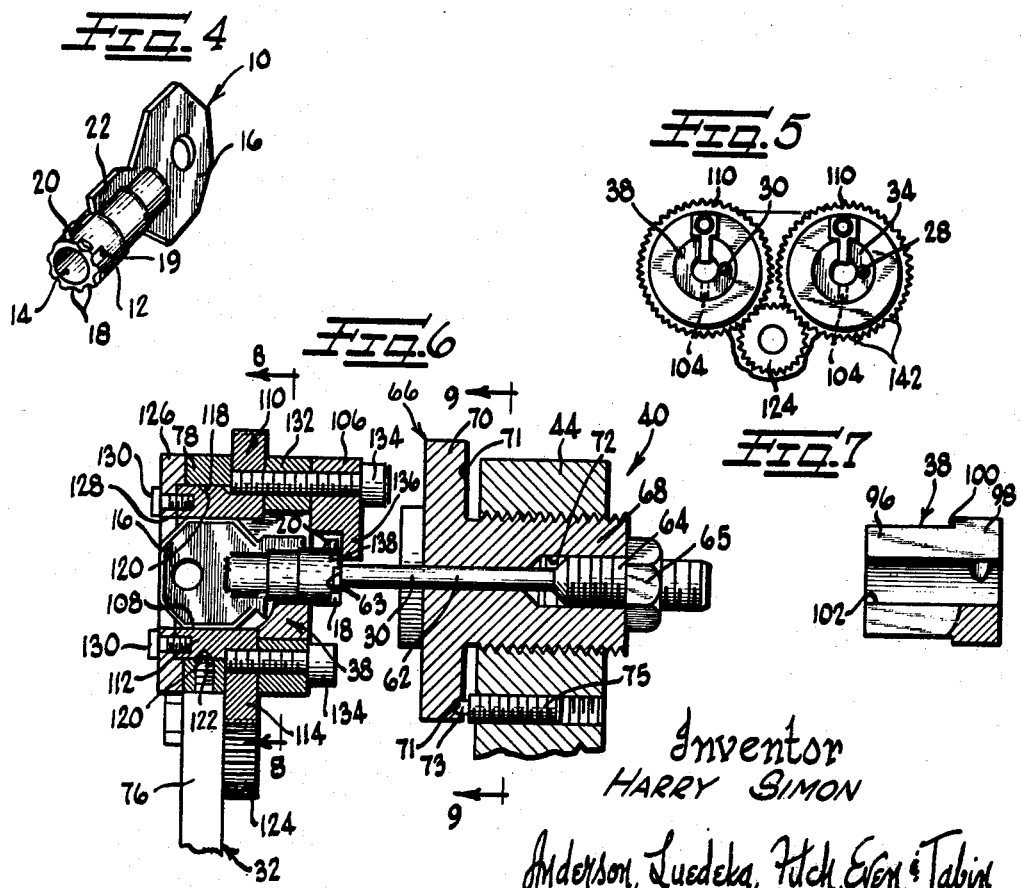
Inventor
HARRY SIMON
Anderson, Luedeka, Fitch, Even, & Tabin
Attorneys

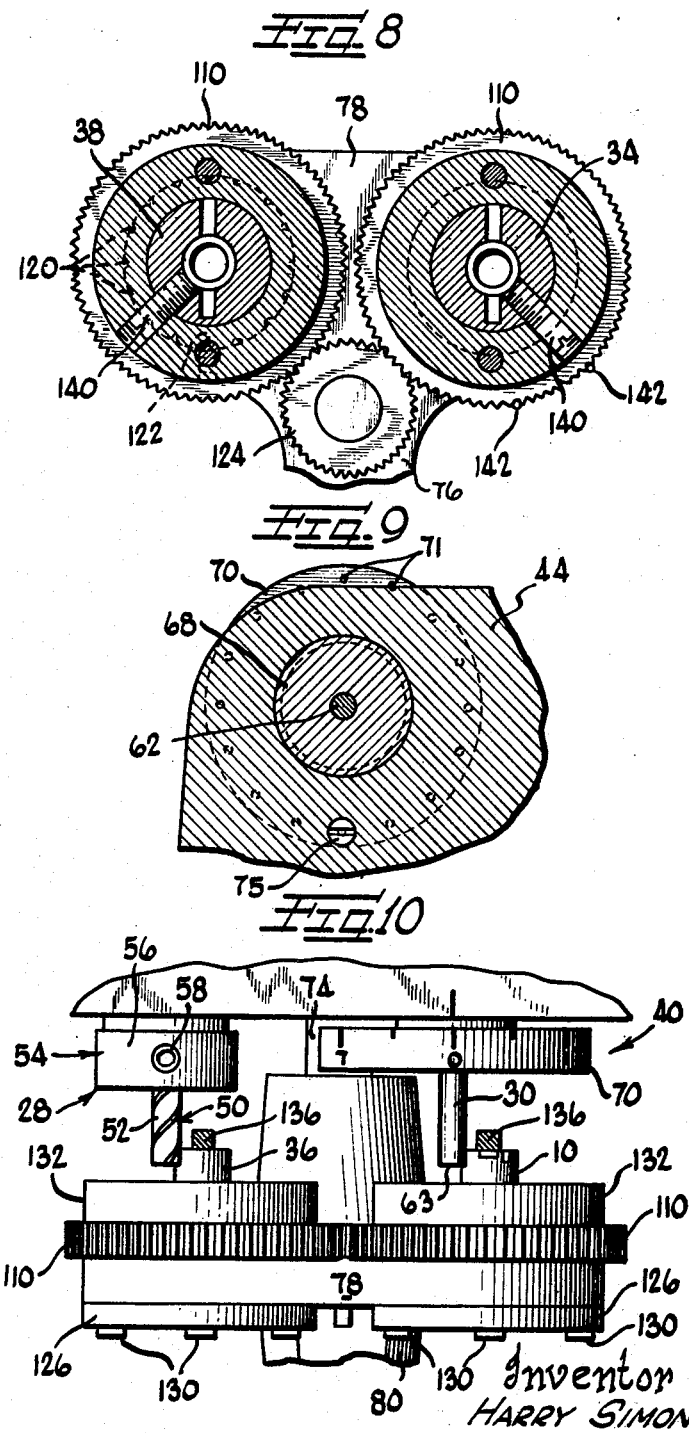

United States Patent Office 3,495,482
Patented Feb. 17, 1970

3,495,482
KEY MACHINE
Harry Simon, 6424 Cottage Grove Ave., Chicago, Ill. 60637
Filed Oct. 30, 1967, Ser. No. 678,822
Int. Cl. B12k *13/00;* B23c *1/16, 1/18*
U.S. Cl. 76—110    15 Claims

ABSTRACT OF THE DISCLOSURE

A machine and method for duplicating a tubular-type key by providing notches in the end edge or side protrusions of the tubular stem of a properly dimensioned key blank. The machine includes means for supporting the key to be duplicated for rotation about the longitudinal axis of the stem of the key, means for supporting the key blank for rotation about the longitudinal axis of the stem of the blank, a cutting tool capable of providing notches in the key blank of the size and depth of the notches in the key to be duplicated, and means for so locating the cutting tool relative to the key blank as to cause a notch to be provided in the key blank corresponding in size and location to each of the notches in the key to be duplicated. A method is also provided for producing a tubular-type key from instructions rather than from an existing key.

---

The present invention relates to the manufacture of tubular-type keys and, more particularly, to methods and machines for duplicating such keys. The invention also relates to methods and machines for manufacturing tubular-type keys from instructions without reference to a key to be duplicated.

The principal object of the invention is to provide an improved method and machine for duplicating tubular-type keys.

A related object of the invention is to provide an improved method and machine for transforming a tubular-type key blank into a predetermined tubular-type key from instructions and without reference to a key to be duplicated.

Other objects and advantages of the invention will become apparent with reference to the following description and the accompanying drawings.

In the drawings:

FIGURE 3 is a plan view of the machine of FIGURES 1 and 2;

FIGURE 4 is a perspective view of a tubular-type key such as is produced by the machine of FIGURES 1-3;

FIGURE 5 is a fragmentary rear sectional elevational view taken along line 5—5 of FIGURE 3;

FIGURE 6 is an enlarged fragmentary sectional elevational view taken along line 6—6 of FIGURE 3;

FIGURE 7 is an elevational view of a portion of the machine shown in FIGURE 6, isolated from the remainder of the machine shown in FIGURE 6;

FIGURE 8 is a fragmentary rear sectional elevational view taken along line 8—8 of FIGURE 6;

FIGURE 9 is a fragmentary rear sectional elevational view taken along line 9—9 of FIGURE 6; and FIGURE 10 is an enlarged fragmentary plan view of a portion of the machine shown in FIGURE 3.

Figure 1:
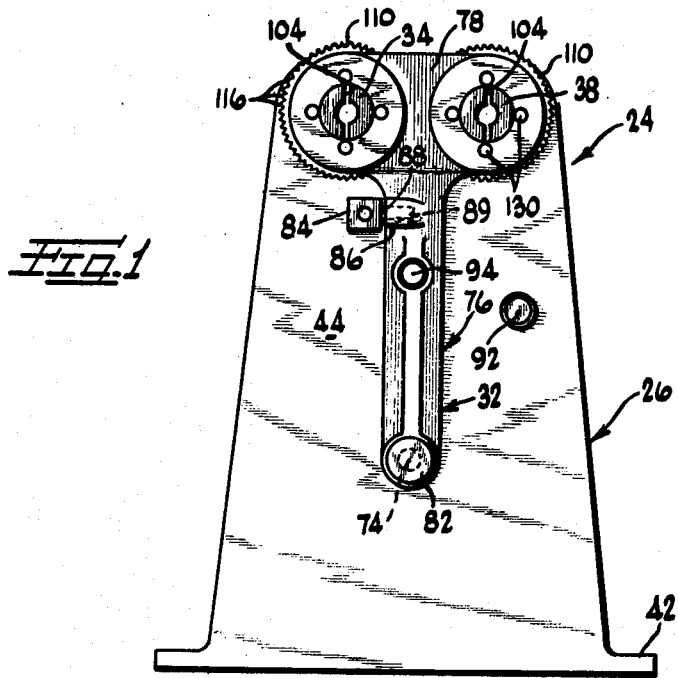
FIGURE 1 is a front elevational view of a machine showing various of the features of the invention.

The present invention is concerned with the manufacture of tubular-type keys such as the key 10 illustrated in FIGURE 4 of the drawings. As illustrated, the key 10 includes a tubular stem 12 having a bore 14 extending longitudinally inwardly from one end (hereinafter the outer end) and having a handle or finger grip 16 affixed to its opposite end. At the outer surface of the outer end of the stem, tumbler-receiving notches 18 are provided end extend longitudinally inwardly for varied but predetermined distances depending upon the construction of the lock with which the key is employed. The notches are relatively shallow and semi-circular in transverse cross section, and terminate inwardly in a flat wall 19 disposed transversely of the longitudinal axis of the stem 12. A flange 20 projects radially outwardly adjacent the one end of the stem intermediate a pair of notches 18 and constitutes an extension 22 of the handle 16 to provide a means for insuring a predetermined rotative position of the key within a lock cylinder. The stem is preferably cut away to accommodate the extension, which may penetrate a short distance into the bore 14.

In certain types of tubular keys commercially available, the notches 18 and the flange 20 are circumferentially spaced about the outer surface of the stem an equal distance from each other. Thus, in the key shown in FIGURE 4, seven notches are provided, each being spaced 45 degrees from one another and from the flange 20. In other forms of keys, eight notches may be provided and spaced 45 degrees from each other with the flange positioned between two notches and spaced 22½ degrees from each.

There is illustrated in the drawings a machine 24 for duplicating a key 10 of the type shown in FIGURE 4. Very generally, the machine 24 comprises a frame 26 having mounted thereon an elongated cutting tool 28 and a guide pin 30. Carried on the frame 26 for movement toward and away from the cutting tool and guide pin is a bracket 32 having mounted thereon a collet 34 adapted to support a key blank 36 and a collet 38 adapted to support the key 10 to be duplicated. The collets 34 and 38 are positioned on the bracket 32 so that when the guide pin 30 is located within the notch 18 of the key 10 to be duplicated, the cutting tool 28 will cut a corresponding notch in the key blank 36.

Means 40 are also provided for selectively adjusting the guide pin 30 in accordance with instructions so that a key can be manufactured without reference to a key to be duplicated.

Referring now in detail to the drawings, the frame 26 of the machine 24 comprises a rectangular base 42 having an integral supporting wall 44 extending upwardly adjacent one of its ends. The base supports an electric motor 46 which is suitably bolted thereto and has a pulley 47 connected by means of a belt 48 to the cutting tool 28, as hereinafter described.

The upstanding wall 44 supports the cutting tool 28 and the guide pin 30 in a stationary manner, although the cutting tool rotates about a fixed axis. The wall 44 also pivotally supports the bracket 32 which carries the collets 34 and 38. The cutting tool 28 is in the form of a cylindrical shaft or rod 50 provided with a spiral groove 52 defining a cutting edge in much the same manner as a conventional drill bit for metal working. The outer end 53 of the cutting tool 28 is flat (FIG. 3) and is disposed transversely to the longitudinal axis of the shaft 50 so that the grooves 18 which are cut in the key blank 36 will terminate in the flat wall 19 disposed transversely to the longitudinal axis of the tubular key stem 12.

The cutting tool 28 is carried in a tool holder 54 which is in the form of an elongated cylinder having a longitudinally extending axial passageway (not shown) for receiving the shaft 50. The tool holder 54 is enlarged at its outer end to form a head 56, and a set screw 58 is provided in the head in communication with the axial passageway to fix the cutting tool relative to the tool holder. The tool holder is journaled for rotation in a suitable bushing (not shown) carried in an opening extending through the supporting wall 44 adjacent the upper end thereof. A pulley 60 is secured to the tool holder 54 for rotation therewith and receives the drive belt 48 of the motor 46. Hence, when the motor 46 is energized, the cutting tool 28 rotates continuously.

The guide pin 30 (FIG. 6) includes an elongated generally cylindrical body portion 62 which defines a flat surface 63 at its outer end, and which includes a threaded end portion 64 of somewhat larger diameter. The pin is carried within a collar 66 having a threaded generally cylindrical neck 68 and a radically directed flange 70. A bore 72 extends longitudinally through the collar 66 in coaxial relation thereto and, adjacent the flange 70, has a slightly greater diameter than the body portion 62 of the pin, but is enlarged and threaded adjacent its opposite end to receive the threaded end portion 64 of the pin. The pin is inserted into the collar 66 with the threaded end portion 64 in engagement with the threads of the bore 72 until the flat end 63 of the pin is located the same distance from the front surface of the wall 44 and, hence, lies in the same plane, as the flat end 53 of the cutting tool 28 when the neck 68 of the collar is fully threaded into a threaded hole provided in the supporting wall 44. The axes of the holes in the wall 44 receiving the cutting tool 28 and pin 30 preferably lie in a horizontal plane.

As has been previously mentioned, the position of the guide pin can be adjusted to permit the manufacture of keys by instructions rather than by reference to a duplicate key. Although this method will be discussed later in detail after the operation of the machine 24 has been fully explained, it should be noted at this point that rotation of the collar 66 will cause the flat end 63 of the pin 30 to move away from or toward the front face of the supporting wall 44 and that the outer periphery of the flange 70 of the collar 66 is marked or inscribed to facilitate control over the degree of rotation (FIGS. 3 and 10). A corresponding aligning mark is provided on the upper edge of the wall 44. In addition, the inner face of the flange 70, i.e., the face adjacent the supporting wall 44, is provided with a plurality of detent notches 71 at predetermined locations, which notches receive a spring-loaded pin 73 carried by a plug 75 in the wall 44, thereby serving to retain the collar in any selected one of several rotative positions.

Figure 2:
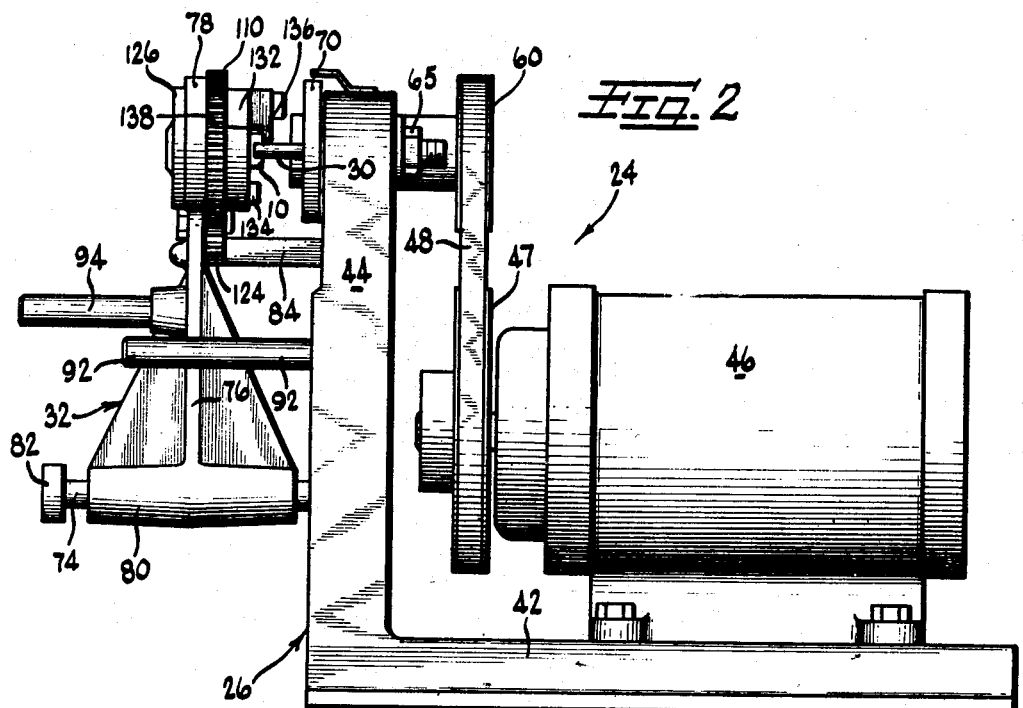
FIGURE 2 is a side elevational view of the machine shown in FIGURE 1.

As previously mentioned, the bracket 32 is pivotably mounted on the upright supporting wall 44 and, in this regard, a rod 74 projects outwardly from the lower portion of the front face of the wall 44 in perpendicular relation thereto and is positioned with its axis intersecting a vertical line passing midway between the axes of the holes provided for the cutting tool 28 and pin 30. The bracket 32 is generally T-shaped in elevation (FIG. 1), having a leg 76 and a cross arm 78. The leg 76 is provided with a socket 80 at its lower end to receive the rod 74, a cap 82 being provided on the end of the rod to retain the bracket thereon. It will be noted from FIGURE 2 that the rod 74 is somewhat longer than the socket 80 to permit sliding movement of the bracket toward and away from the supporting wall 44 in addition to the pivotable movement of the bracket. The extent of this sliding movement is at least as great as, and preferably greater than, the length of the longest notch 18 to be provided in the key blank 36, as measured longitudinally of the stem 12.

Thus, the bracket 32 is free to pivot about the rod 74 and, accordingly, to move the key blank 36 and the key 10 laterally into contact with the cutting tool 28 and the guide pin 30 respectively. Pivotal movement of the bracket is limited in a counterclockwise direction, as viewed in FIGURE 1, so that the radial depth of the notch 18 cut into the key blank will be uniform in all instances. In the illustrated embodiment, limitation of the lateral movement is accomplished by means of a stop block 84 which extends outwardly from the front face of the supporting wall 44 and is of rectangular cross sectional configuration so as to present a flat surface 86 for contact by the bracket 32. The bracket is, in turn, provided with a button 88 positioned so as to engage the face 86 of the block 84. The button 88 is defined by the outer end of a set screw 89 threaded into a side edge of the leg 76 adjacent the stop block 84, the set screw being thereby movable inwardly and outwardly of the side edge so that the position of the button, the position of rest of the bracket in the counterclockwise direction and, hence, the extent of radial penetration of the cutting tool laterally into the key blank, can be adjusted. Clockwise pivotal movement of the bracket 32 is limited by a bar 92 which projects outwardly from the wall 44, thereby preventing the bracket from swinging downwardly into contact with the surface on which the machine 24 is supported. A handle 94 projects outwardly from the bracket 32 to facilitate the grasping thereof.

Each the key blank and the key to be duplicated are carried individually in the collets 34 and 38 respectively. The collets are removably mounted on the bracket 32 and can therefore be replaced by collets having the same outer dimensions but capable of accommodating keys of different sizes. Thus, although tubular-type keys may be manufactured in different sizes by different manufacturers, all can be accommodated by the machine 24. Each collet, as shown in FIGURE 7, includes a neck portion 96 and an enlarged head portion 98, the inner or left face of the head defining a shoulder 100 which determines the position of the collet relative to the bracket 32. A generally cylindrical passageway 102 extends axially through the collet and has a diameter slightly greater than that of the stem 12 of the key or key blank. In addition, a radial slot 104 (FIG. 1) is provided which extends inwardly of the collet from the outer surface thereof to the passageway 102 on the entire length of the collet, and also extends outwardly of the collet from the passageway 102 to the outer surface from the outer end of the neck 96 to adjacent the head 98. Thus, the slot 104 would divide the collet into halves except for a small unsevered portion of the head and a very small unsevered portion of the neck adjacent thereto.

As can be seen in FIGURE 6, the slot 104 of the neck 96 of the collet receives the handle 16 of the key, which is of greater width than the diameter of the stem and therefore could not be accommodated by the passageway 102 absent the slot. The slot 104 of the upper portion of the head 98 of the collet permits the collet to be inserted into an opening in the bracket 32 past a key stop 106, referred to in greater detail shortly.

Each collet 34 and 38 is carried within a central opening 108 of a gear 110. As illustrated in FIGURE 6, the gear 110 includes a neck 112 and a flange 114, the flange being provided with teeth 116 on its outer periphery. Each gear is supported in an opening 118 in the cross arm 78 of the bracket, the axes of the openings 118 being spaced from each other a distance equal to the spacing between the axes of the cutting tool 28 and guide pin 30. Each opening 118 is therefore positioned adjacent one end of the cross arm 78.

The outer cylindrical surface of the neck 112 of one of the gears 110, the gear to the right in the illustrated embodiment (FIG. 1) which carries the key 10, is provided with a plurality of notches 120 (FIG. 6), each of which is spaced 22½ degrees angularly from an adjacent notch. An opening extends upwardly from the lower edge of the cross arm 78 into communication with the opening 118 and is threaded to receive a spring-loaded pin 122 which engages each of the notches 120 successively as the gear rotates to determine certain angular rotative positions of the gear which correspond to the angular positions in which a notch 18 may be desired in a key blank 36. The gears 110 are trained for rotation in the same direction by an idler gear 124. Thus, since the gears are trained, the notches 120 and the pin 122 of the right gear 110 serve also to control the rotative position of the left gear.

Each gear 110 is retained within its opening 118 in the bracket 32 by a retaining ring 126 which includes a central opening 128 having a diameter substantially equal to the outer diameter of the neck 96 of one of the collets 34 and 38, and has an outer diameter essentially equal to the vertical dimension of the cross arm 78 of the bracket. The retaining ring therefore extends past the periphery of the opening 118 in which the gear 110 is disposed and is secured to the gear by the cap screws 130 which extend through the ring and longitudinally into the neck 112 of the gear.

Secured to the opposite end or flange 114 of each gear 110 is a spacer ring 132 having a central opening large enough to accommodate the head 98 of a collet 34 or 38 and having an outer diameter essentially equal to that of the retaining ring 126. The spacer ring has a thickness essentially equal to the height of the head 98 of the collet so that its outer flat surface and the outer flat surface of the head will be essentially flush when the collet is in place. The spacer ring is held in place by cap screws 134, one of which also secures the stop 106 in place adjacent the outer surface of the spacer ring.

The stop 106 includes a finger 136 which overhangs the passageway 102 of the collet and defines a forwardly facing shoulder 138 adapted to be abutted by the outer end of the stem 12 of the key 10 or key blank 36, whichever the case may be. The shoulders 138 of each stop 106 are positioned identically relative to the inner face of the bracket 32 so that the outer ends of the stems of the key and key blank will lie in the same plane when abutting the stop. Since the ends of the cutting tool 28 and guide pin 30 also lie in the same plane, accurate duplication of the key 10 can be assured. The stop is located so as to align with the slots 104 of the collets 34 and 38 so that it will be aligned with the flange 20 of the key as well. Thus, when the notches are cut beginning with the notch adjacent the flange, the first and last cuts are made on opposite sides of the stop 106, avoiding interference therewith.

The key blank 36 and the key 10 are held within their respective collets 34 and 38, and the collets held within their respective gears 110, by a set screw 140 which extends through the neck of the gear and the collet, as seen in FIGURE 8.

Since the stop 106 projects outwardly from the gear 110 past the outer end of the stem of the key blank 36, it is possible that the stop could be inadvertently brought into contact with the cutting tool 28 and damaged hereby. To eliminate this possibility, a stop pin 142 is provided in each of a pair of circumferentially spaced roots of one of the gears 110 and is adapted to be engaged by teeth of the idler gear 124. Each pin 142 limits rotation of the gears 110 in one of two directions so that the stop 106 will not engage the cutting tool from either direction of rotation. The interengagement of the stop pin and stop prevents rotation of the idler gear 124 and, hence, of the gears 110 past a given rotative position, as shown in FIGURE 8.

In the use of the machine 24 to duplicate a key 10, the key 10 is inserted within a suitable collet 38 (FIGURE 1) and secured therein by a set screw 140. A key blank 36 is secured within a suitable collet 34 by means of a set screw 140. When the key and key blank are so secured in place, the outer ends of the stems 12 of each abut the shoulder 138 of the adjacent stop 106 and the outer ends of the key and blank therefore lie in the same plane.

The motor 46 is energized and the bracket 32 is then shifted until the flat end 63 of the guide pin 30 occupies a notch 18 of the key 10 to be duplicated, with the flat end 63 of the guide pin abutting the flat end 19 of the notch. When the bracket is so located relative to the guide pin 30, the cutting tool 28 will be similarly located relative to the key blank 36 and will cut a notch therein identical to the notch 18 in the key to be duplicated.

The key to be duplicated is then rotated a given increment equal to the angular distance between notches of the key 10, i.e., 45 degrees, and the procedure is repeated for the next notch. In this regard, rotation of the gear 110 supporting the key 10 to be duplicated causes rotation of the other gear 110 supporting the key blank 36 by virtue of the idler gear 124. Also, the rotative positions of the key 10 to be duplicated, in which a notch 18 is aligned with the guide pin 30, are determined by the movement of the spring loaded pin 122 into a notch 120 of the gear 110 supporting the key to be duplicated.

The procedure is repeated for each of the notches of the key 10 until a notch has been provided in the key blank 36 corresponding to each notch of the key to be duplicated. Preferably, the first notch duplicated is that adjacent the stop 106 (and adjacent the flange 20 of the key) so that all of the notches can be duplicated by rotating the gears until rotation is arrested by the inter-engagement of the pin 142 and a tooth of the gear 124. The set screws 140 can then be loosened and the keys removed.

As previously mentioned, the machine 24 can also be utilized to produce a key from instructions rather than from a key to be duplicated. This is accomplished by placing a key blank 36 in each of the collets 34 and 38. It will be noted from FIGURE 6 that the collar 66 supporting the guide pin 30 projects outwardly a short distance past the front face of the supporting wall 44. Thus, when the collar is rotated so as to move the guide pin inwardly of the supporting wall 44 a slight distance, the net effect on the bracket 32 is the same as if the pin 30 had entered a notch 18 of a key to be duplicated. In other words, the bracket 32 will be located the same distance from the supporting wall 44 if the guide pin enters a notch 18 of a key to be duplicated or if the guide pin 30 is retracted slightly a distance equal to the depth of a notch and the guide pin engages the edge of a blank key.

Pursuant to instructions, therefore, the collar 66 is rotated to vary the position of the flat end of the guide pin 30 relative to the supporting wall 44, with the various positions of rotation being indicated by marks provided on the flange 70 of the collar. Thus, for a given relative position of the key blank 10, the instructions may indicate that the collar 66 should be maintained in position "4."

When the collar is so positioned, a given depth of cut or notch will be made in the key blank 36. The key blank is then rotated to the next cutting position and the collar 66 is rotated to the next position in accordance with the instructions.

While various of the features of the invention have been shown and described with respect to one specific embodiment thereof, it should be apparent that various modifications may be made therein without departing from the scope of the invention.

Various of the features of the invention are set forth in the following claims.

What is claimed is:

1. A machine for duplicating a tubular key having a generally tubular stem and notches extending longitudinally inwardly from the outer end edge of the stem by providing notches in the end edge of the tubular stem of a properly dimensioned key blank, said machine comprising means for supporting the key to be duplicated for rotation about the longitudinal axis of the stem of the key, means for supporting the key blank for rotation about the longitudinal axis of the stem of the blank, a cutting tool capable of providing notches in the key blank of the size and depth of the notches in the key to be duplicated, and means for so locating the cutting tool relative to the key blank as to cause a notch to be provided in the key blank corresponding in size and location to each of the notches in the key to be duplicated.

2. A machine in accordance with claim 1, wherein said supporting means for the key to be duplicated and the key blank maintain the stems of the key to be duplicated and the key blank in stationary and parallel relation to each other.

3. A machine in accordance with claim 2, wherein means are provided for causing one of the key to be duplicated and the key blank to rotate in a direction identical to the direction of rotation of the other of the key to be duplicated and the key blank, the direction of rotation of each being determined as each is viewed from the same location relative to it.

4. A machine in accordance with claim 2, wherein said support for the key to be duplicated is mounted on a rotatably mounted first gear with the longitudinal axis of the stem of the key to be duplicated coincident with the axis of rotation of said first gear, wherein said support for the key blank is mounted on a rotatably mounted second gear with the longitudinal axis of the stem of the key blank coincident with the axis of rotation of said second gear, and wherein an idler gear is disposed intermediate said first and second gears so as to cause rotation of one of the gears to be transmitted to the other.

5. A machine in accordance with claim 15, wherein the cutting tool is in the form of a shaft having a cutting edge adjacent its outer surface, and wherein the end of the shaft adapted to engage the key blank has a generally flat face disposed generally perpendicular to the longitudinal axis of the shaft.

6. A machine in accordance with claim 5, wherein the guide pin has a diameter equal to the diameter of the cutting tool.

7. A machine in accordance with claim 15, wherein a stationary frame is provided, wherein said cutting tool and said guide pin are mounted on said frame, wherein a bracket is supported on said frame for sliding movement toward and away from the cutting tool and guide pin on an axis parallel to the axis of rotation of said cutting tool, and wherein said means for supporting the key to be duplicated and the key blank are mounted on said bracket.

8. A machine in accordance with claim 7, wherein said bracket is mounted for pivotal movement about an axis parallel to the axis of rotation of said cutting tool.

9. A machine in accordance with claim 1, wherein means are provided for maintaining the key to be duplicated and the key blank in given rotative positions for each notch provided.

10. A machine in accordance with claim 7, wherein means are provided for selectively locating each the key to be duplicated and the key blank in a given position relative to said support frame.

11. A machine in accordance with claim 1, wherein said support for said key to be duplicated is adapted to accommodate keys of various sized stems, and wherein said support for said key blank is adapted to accommodate key blanks of various sizes.

12. A machine in accordance with claim 1, wherein a stop means is provided to locate the outer end edge of the key blank relative to the key blank support, and wherein means are provided to prevent the stop means from engaging the cutting tool.

13. A machine in accordance with claim 5, wherein means are provided for moving the outer end edge of the guide pin along the longitudinal axis of the guide pin to facilitate the manufacture of keys by code number.

14. A method of manufacturing a tubular key having a generally tubular stem and notches of predetermined size and location extending longitudinally inwardly from the outer end edge of the stem by providing notches in the end edge of the tubular stem of a properly dimensioned key blank, which method comprises supporting the key blank for rotation about the longitudinal axis of the stem thereof adjacent a tool capable of cutting notches in the stem, locating the key blank in a given rotative position for each notch to be provided, engaging the key blank with a cutting tool while the key blank is at each of the rotative positions, causing the cutting tool to penetrate inwardly from the outer end edge of the stem of the key blank until the key blank support engages a selectively positionable shoulder, and positioning the shoulder for each rotative position of the key blank in accordance with instructions prior to the cutting of each notch so as to provide a notch of predetermined size for each rotative position.

15. A machine in accordance with claim 2, wherein said cutting tool is rotatable about a stationary axis, and wherein a stationary guide pin is provided having a longitudinal axis parallel to the axis of rotation of said cutting tool and spaced therefrom a distance equal to the distance between the longitudinal axes of the stems of the key to be duplicated and the key blank.

References Cited
UNITED STATES PATENTS

| | | | |
|---|---|---|---|
| 1,978,009 | 10/1934 | Caron | 90—13.05 |
| 3,011,411 | 12/1961 | Raymond | 90—13.05 |

BERNARD STICKNEY, Primary Examiner

U.S. Cl. X.R.

90—13.05